(12) United States Patent
Matsumoto et al.

(10) Patent No.: US 10,960,892 B2
(45) Date of Patent: *Mar. 30, 2021

(54) AUTOMATED OPERATION VEHICLE CONTROL DEVICE AND AUTOMATED OPERATION VEHICLE

(71) Applicant: Logic Meister Inc., Osaka (JP)

(72) Inventors: Yoshinori Matsumoto, Osaka (JP); Yoshihiro Ito, Osaka (JP)

(73) Assignee: Logic Meister Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/003,137

(22) Filed: Aug. 26, 2020

(65) Prior Publication Data
US 2020/0385006 A1    Dec. 10, 2020

Related U.S. Application Data

(63) Continuation-in-part of application No. 15/933,628, filed on Mar. 23, 2018, now Pat. No. 10,761,528.

(51) Int. Cl.
| | |
|---|---|
| *B60W 40/08* | (2012.01) |
| *B60W 60/00* | (2020.01) |
| *B60R 22/32* | (2006.01) |
| *B60Q 1/50* | (2006.01) |
| *B60Q 1/52* | (2006.01) |

(52) U.S. Cl.
CPC ............. *B60W 40/08* (2013.01); *B60Q 1/503* (2013.01); *B60Q 1/52* (2013.01); *B60R 22/322* (2013.01); *B60W 60/0016* (2020.02); *B60W 2040/0881* (2013.01); *B60W 2540/221* (2020.02); *B60W 2540/26* (2013.01)

(58) Field of Classification Search
CPC ................. B60K 28/066; B60Q 1/503; B60Q 2300/146; B60Q 7/00; B60Q 9/00; B60R 25/01; B60R 25/102; B60W 2540/00; B60W 2540/01; B60W 2540/221; B60W 30/10; B60W 30/16; G05D 1/0061; G05D 1/0088; G05D 2201/0213; G08B 21/043; G08B 5/36; G08B 7/06
See application file for complete search history.

(56) References Cited

U.S. PATENT DOCUMENTS 3,947,815 A  *  3/1976  Muncheryan .......... B60Q 1/503
                                                                340/575
5,121,527 A     6/1992  Righi
(Continued)

OTHER PUBLICATIONS

Vivekanandan et al., "Automatic Seatbelt Release System," IAETSD Journal for Advanced Research in Applied Sciences, 2018, vol. 5(2), pp. 544-552.

(Continued)

*Primary Examiner* — Babar Sarwar
(74) *Attorney, Agent, or Firm* — Potomac Law Group, PLLC; Kenneth Fagin (57) ABSTRACT

An automated operation vehicle control unit is configured to perform a detection process in which an abnormal condition of a passenger of a vehicle is detected and a notification process in which pedestrians are notified of the abnormal condition detected in the detection process in a case where the abnormal condition of the passenger is detected in the detection process.

5 Claims, 9 Drawing Sheets

(56) References Cited

U.S. PATENT DOCUMENTS

| | | | | | |
|---|---|---|---|---|---|
| 5,942,979 | A * | 8/1999 | Luppino | | B60K 28/066 |
| | | | | | 180/272 |
| 6,980,125 | B1 * | 12/2005 | Barber | | G08G 1/07 |
| | | | | | 116/63 R |
| 10,545,024 | B1 * | 1/2020 | Konrardy | | B60R 25/102 |
| 2003/0015898 | A1 * | 1/2003 | Breed | | B60N 2/002 |
| | | | | | 297/216.12 |
| 2003/0169162 | A1 * | 9/2003 | Hyman | | B60H 1/00978 |
| | | | | | 340/438 |
| 2009/0134984 | A1 * | 5/2009 | Chen | | G09F 21/04 |
| | | | | | 340/425.5 |
| 2009/0139069 | A1 | 6/2009 | Thomas | | |
| 2012/0095646 | A1 * | 4/2012 | Ghazarian | | G01S 19/17 |
| | | | | | 701/36 |
| 2015/0134180 | A1 * | 5/2015 | An | | G08G 1/005 |
| | | | | | 701/23 |
| 2015/0166059 | A1 * | 6/2015 | Ko | | B60T 7/22 |
| | | | | | 701/28 |
| 2015/0264256 | A1 * | 9/2015 | Lehtiniemi | | H04N 5/23293 |
| | | | | | 348/143 |
| 2016/0200219 | A1 * | 7/2016 | Tjahjono | | G01S 5/0027 |
| | | | | | 340/457 |
| 2016/0229397 | A1 * | 8/2016 | Muthukumar | | B60W 10/20 |
| 2016/0303969 | A1 * | 10/2016 | Akula | | A61B 5/7475 |
| 2016/0311323 | A1 * | 10/2016 | Lee | | B60K 35/00 |
| 2017/0057516 | A1 * | 3/2017 | Gordon | | G05D 1/0088 |
| 2017/0106876 | A1 * | 4/2017 | Gordon | | B60W 30/182 |
| 2017/0108865 | A1 * | 4/2017 | Rohde | | G05D 1/0214 |
| 2017/0267256 | A1 * | 9/2017 | Minster | | B60W 50/082 |
| 2017/0327094 | A1 * | 11/2017 | Inoue | | B60W 30/09 |
| 2018/0043901 | A1 * | 2/2018 | Kim | | A61B 5/024 |
| 2018/0052000 | A1 * | 2/2018 | Larner | | G01C 21/3484 |
| 2018/0053411 | A1 * | 2/2018 | Wieskamp | | G08G 1/087 |
| 2018/0056784 | A1 * | 3/2018 | Virgilio | | B60R 21/01 |
| 2018/0075565 | A1 * | 3/2018 | Myers | | G06Q 30/02 |
| 2018/0136655 | A1 * | 5/2018 | Kim | | B60N 2/002 |
| 2018/0335776 | A1 * | 11/2018 | Theis | | B60W 30/182 |
| 2019/0294161 | A1 | 9/2019 | Matsumoto et al. | | |

OTHER PUBLICATIONS

Copies of References Are Not Being Filed Herewith. They Are Already of Record in One or More of the Following Applications, Which Are Being Relied on for Priority Under 35 U.S.C. Section 120 (see 37 C.F.R. Section 1.98(d)(1)): U.S. Appl. No. 15/933,628, filed Mar. 23, 2018.

* cited by examiner

AUTOMATED OPERATION VEHICLE CONTROL DEVICE AND AUTOMATED OPERATION VEHICLE

BACKGROUND OF THE INVENTION

1. Field of the Invention

Aspects disclosed herein relate to an automated operation vehicle control unit and an automated operation vehicle.

2. Description of Related Art

Known automated operation vehicle control units, as disclosed in Japanese Unexamined Patent Application Publication No. 2014-106854A, have a following configuration. Namely, the automated operation vehicle control units are configured to perform acquiring a vehicle traveling state and a driver state, giving the driver a warning in order to encourage the driver to cancel the automated operation driving in a case where the conditions required for the automated operation driving are not satisfied, and causing the vehicle to travel to a stop spot and to stop at the stop spot in a case where the driver does not cancel the automated operation driving.

As described above, the automated operation vehicle control units are focused on their response to an abnormal situation occurred.

SUMMARY OF THE INVENTION

The present invention has an object of providing an automated operation vehicle control unit and an automated operation vehicle that allow for a quick rescue when a passenger including a driver falls into an abnormal condition.

According to the one or more aspects of the invention, the automated operation vehicle control unit may be configured to perform a detection process in which an abnormal condition of a passenger of a vehicle is detected, and a notification process in which pedestrians are notified of the abnormal condition in a case where the abnormal condition of the passenger is detected in the detection process.

According to the configuration described above, the notification process allows the pedestrians to notice the abnormal condition of the passenger and a quick rescue can be achieved.

The automated operation vehicle control unit of the present invention may be further configured to perform a stop process in which the vehicle is caused to stop in a case where the abnormal condition of the passenger is detected in the detection process while the vehicle is traveling.

According to the configuration described above, the vehicle traveling is caused to stop and a quick rescue for the passenger can be achieved.

The automated operation vehicle control unit of the present invention may be further configured to perform an unlock process in which a power door lock mechanism configured to lock a door of the vehicle automatically is caused to unlock the door after the vehicle is caused to stop in the stop process.

According to the configuration described above, the door is unlocked after the stop of the vehicle under the condition that the passenger cannot open or close the door. Thus, the pedestrians can open the door without a vehicle key and bring the passenger out of the vehicle.

The automated operation vehicle control unit of the present invention may be further configured to perform a door-open process in which an automatic door of the vehicle is caused to open after the vehicle is caused to stop in the stop process.

According to the configuration described above, the automatic door is opened after the stop of the vehicle under the condition that the passenger cannot open or close the automatic door. Thus, the pedestrians can bring the passenger out of the vehicle quickly.

The automated operation vehicle control unit of the present invention may be further configured to perform a window-open process in which a power window of the vehicle is caused to open after the vehicle is caused to stop in the stop process.

According to the configuration described above, the power window is caused to open after the stop of the vehicle under the condition that the passenger cannot operate the power window. Thus, the pedestrians can speak to the passenger.

In the notification process by the automated operation vehicle control unit of the present invention, a light of the vehicle may be caused to light in a predetermined manner to notify of the abnormal condition of the passenger.

According to the configuration described above, the abnormal condition of the passenger can be noticed in darkness.

The automated operation vehicle control unit of the present invention may be mounted on the vehicle. The vehicle may include a display configured to display information in a manner that the information can be recognized by the pedestrians. In the notification process by the automated operation vehicle control unit, the display is caused to display message information including personal information of the passenger.

According to the configuration described above, due to the message information including the passenger's personal information, the pedestrians can easily acquire the identification information and medical history of the passenger and destination to which the passenger should be taken.

In the notification process by the automated operation vehicle control unit of the present invention, the display may be caused to display the message information including the personal information of the passenger after a predetermined time period for observation has elapsed since the vehicle is caused to stop in the stop process.

According to the configuration described above, in a case where the passenger remains incapable of having a conversation for equal to or longer than the predetermined time period for observation since the vehicle is caused to stop, the identification information, a medical history, and destination to which the passenger should be take can be acquired easily due to the message information including the personal information of the passenger.

The automated operation vehicle control unit of the present invention may be further configured to perform a conversation process in which a conversation with the passenger is performed in a case where the abnormal condition of the passenger is detected in the detection process and a conscious-level-determination process in which a conscious level of the passenger is determined from the content of the conversation in the conversation process. Additionally, the display may be caused to display the message information including the personal information of the passenger in the notification process in a case where it is determined that the conscious level of the passenger is a level at which the passenger is incapable of communication in the conscious-level determination-process.

According to the configuration described above, in a case where the conscious level of the passenger is a level at which the passenger is incapable of communication, the identification information, a medical history, and a transfer destination of the passenger can be acquired easily due to the message information including the personal information of the passenger.

The automated operation vehicle control unit of the present invention may be further configured to perform a restart process in which the vehicle is caused to travel to the nearest hospital in a case where the passenger is in the vehicle after a predetermined time period for waiting a rescue has elapsed since the vehicle is caused to stop in the stop process.

According to the configuration described above, the vehicle, which has once stopped, is allowed to transport the passenger to a hospital when the passenger falls into the abnormal condition at an empty area, in particular, without a person that calls an emergency vehicle.

The automated operation vehicle of the present invention may include the automated operation vehicle control unit having the configuration described above, a window, and a transmissive display disposed on the window. In the notification process, the transmissive display may be caused to display rescue-information about the abnormal condition.

According to the configuration described above, the rescue-information is displayed by the transmissive display. By the display of the rescue-information, a person located far away from the vehicle can easily recognize the condition of the passenger.

The automated operation vehicle control unit of the present invention may further include a detection unit that detects the abnormal condition information of the passenger to be used in the detection process, a seating detection unit to detect seating on the seat of the vehicle, a seat belt detection unit that is provided at a seating position and detects the wearing state of a seat belt, and the seat belt includes a seat belt releasing mechanism that forcibly releases the worn seat belt by the control of the processor. And the processor automatically executes a process of canceling wearing state of the seat belt by driving the seat belt releasing mechanism when the passenger's abnormal condition is detected by the detection process of the processor.

According to the configuration described above, when people outside of the vehicle notice the passenger's abnormal condition, they don't have to release the seat belt of the passenger. Thus it is easy for them to rescue the passenger.

The seating detection unit and the seat belt detection unit in the automated operation vehicle control unit of the present invention may be provided at each seat of the vehicle. The seat belt detection unit detects the wearing state of the seat belt corresponding seat, and the seat belt releasing mechanism is set to the seat belt detection unit. When at least one passenger other than the driver is in the vehicle and the driver's abnormal condition is detected, the processor controls the seat belt releasing mechanism to release the seat belts of the driver's seat and other passenger's seats that the seating is detected.

According to the configuration described above, the passenger other than the driver does not need to unlock the seat belt, so it is easier for the passenger inside the vehicle to rescue the driver than the people outside the vehicle.

BRIEF DESCRIPTION OF THE DRAWINGS

Aspects of the invention are illustrated by way of example and not by limitation in the accompanying figures in which like reference characters indicate similar elements.

DETAILED DESCRIPTION OF THE INVENTION

Embodiments of the present invention are described below on the basis of the drawings.

Overview of Automated Operation Vehicle Control Unit 1

Figure 1:
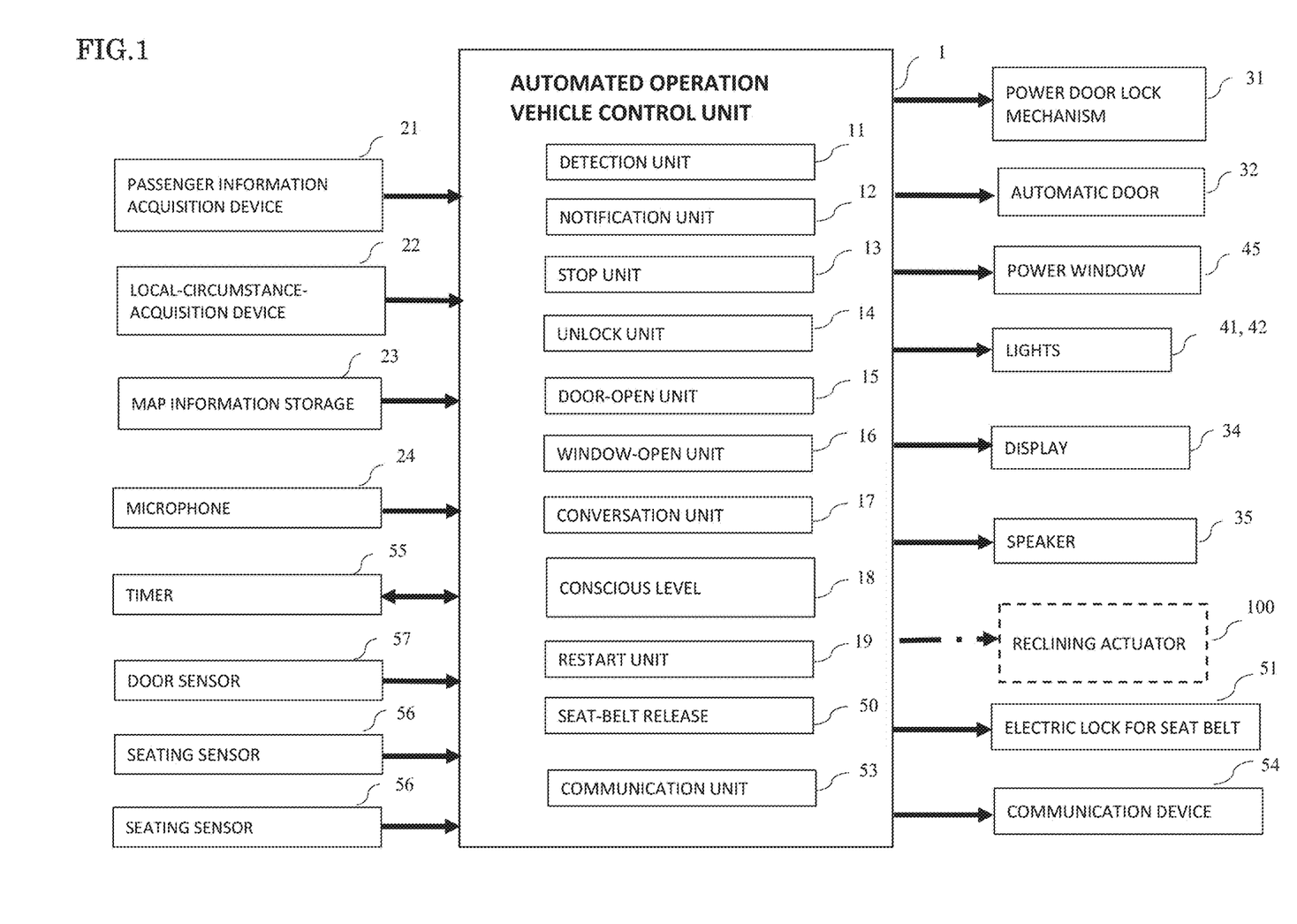
FIG. 1 is a block diagram illustrating a vehicle including an automated operation vehicle control unit.

An automated operation vehicle control unit 1 is an automated operation controller implementing an automated operation control function as shown in FIG. 1. The automated operation control function includes an abnormal condition handling function that causes a vehicle 4A to operate in order to notify a person 5B at a periphery of the vehicle 4A of an abnormal condition of a passenger, as a part of the automated operation control function. The abnormal condition handling function may be performed either of while the vehicle 4A is traveling or while the vehicle 4A is stopped. When performed while the vehicle 4A is traveling, the abnormal condition handling function can make a passenger of a vehicle 4B traveling at the periphery of the vehicle 4A notice the abnormal condition. The passenger, who has noticed the abnormal condition, can arrange for a hospital, an emergency vehicle including an ambulance and/or perform first-aid after a stop of the vehicle 4A. Also, when performed while the vehicle 4A is stopped, the abnormal condition handling function can make the person 5B including a pedestrian at the periphery of the vehicle 4A notice the abnormal condition. Note that the automated operation vehicle control unit 1 may be employed during both automated operation and manual operation. When the passenger including a driver falls into the abnormal condition during the manual operation, the current operation mode may be switched into the automated operation, followed by a performance of the abnormal condition handling function.

The term "passenger" may include both a single passenger and a plurality of passengers. The passenger may include all persons riding in the vehicle 4A or may be a person 5A sitting on a particular seat such as a driving seat, a front passenger seat, or a rear seat. Additionally, the passenger is not limited to a human, and may be an animal including a pet. The term "an abnormal condition of a passenger" means poor physical condition which requires the aid of others. Clouding of consciousness, lapse of consciousness, seizure, or spasm by a disorder such as myocardial infarction, cerebral infarction, high fever, hypertension, or hypotension is exemplified as "an abnormal condition".

Figure 2:
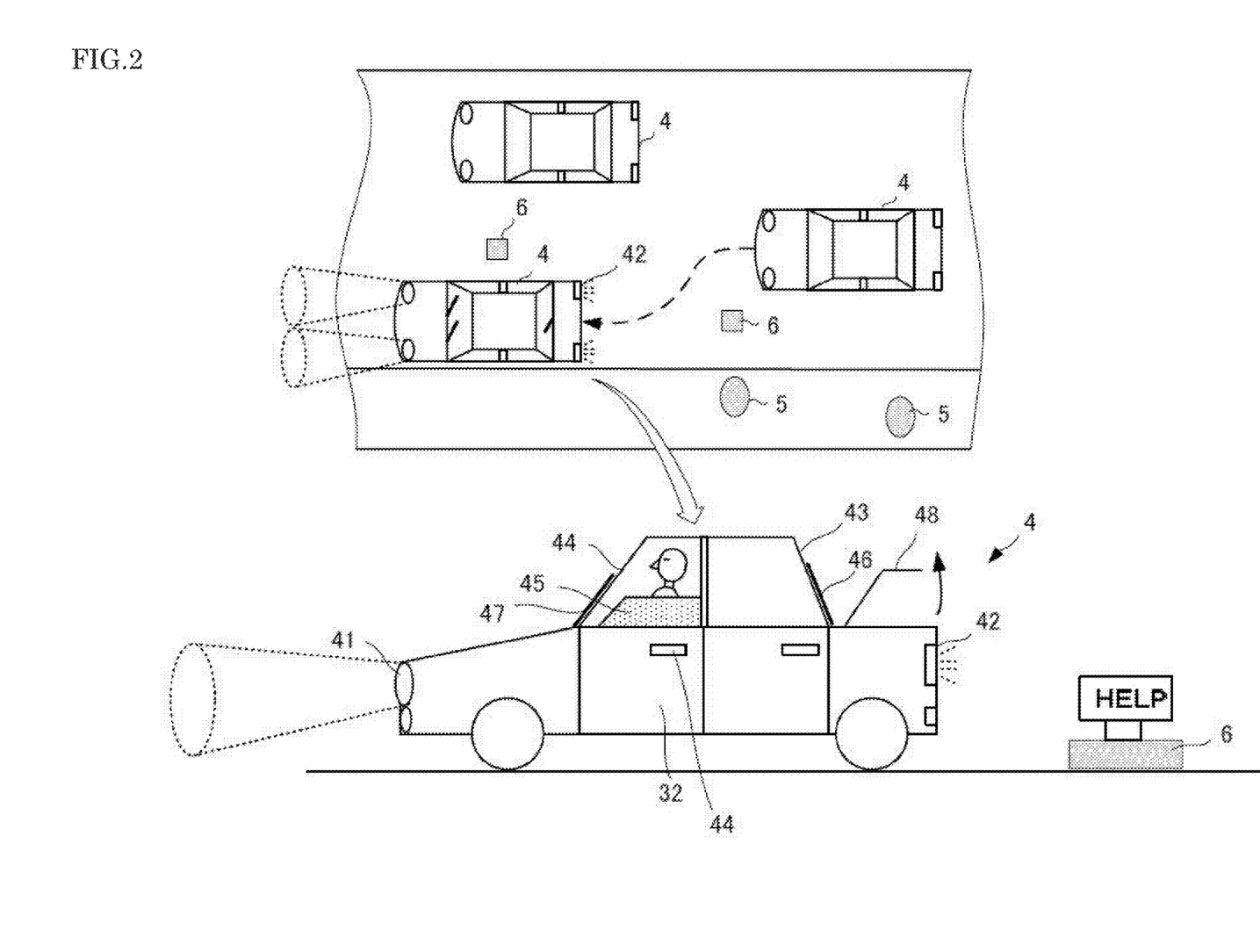
FIG. 2 is a schematic diagram illustrating operation of the automated operation vehicle control unit.

The term "vehicle 4A" includes an internal-combustion-engine vehicle employing an internal combustion engine, an electric vehicle employing an electric motor, and a hybrid vehicle employing the internal combustion engine and the electric motor. The electric vehicle includes a fuel-cell vehicle employing a fuel cell. Specific examples of the vehicle 4A include a passenger car, a truck, a motorcycle, a bus, a lawnmower, a recreational vehicle, an amusement-park vehicle, agricultural machinery, construction equipment, a tram, a golf cart, a train, a trolley, and the like. It should be noted that the vehicle 4A in this embodiment is not limited to transport apparatuses that travel on the ground, but includes other transport apparatuses such as a boat, which moves on the surface of the water, an airplane or a helicopter, which moves over the sky. The term "a periphery of a vehicle" means an area where the vehicle 4A can be viewed by a human being. The term "a person 5B at a periphery of a vehicle" means, as shown in FIG. 2, may include the passenger of the vehicle 4B traveling at the periphery of the vehicle 4A, and any persons 5B walking, stopping, or sitting, at the periphery of the vehicle 4A.

Specific Example of Automated Operation Vehicle Control Unit 1

As shown in FIG. 1, the automated operation vehicle control unit 1 includes a detection unit 11 that detects the abnormal condition of the passenger of the vehicle 4A, and a notification unit 12 that notifies the pedestrians 5B 4A of the abnormal condition detected when the detection unit 11 detects the abnormal condition of the passenger. According to these functions, when the passenger falls into the abnormal condition, the notification unit 12 makes the pedestrians 5B aware of the abnormal condition of the passenger by the notification unit 12 and a quick rescue can be achieved.

Automated Operation Vehicle Control Unit 1: Detection Unit 11

The detection unit 11 has a determination function. Namely, the detection unit 11 acquires abnormal-element information from a passenger information acquisition unit 21 that detects at least one abnormal element of body temperature, cardiac sound, breath, and behavior. On the basis of the acquired abnormal-element information, the detection unit 11 determines whether the passenger is in an abnormal condition. The passenger information acquisition unit 21 may include an imaging unit provided with an infrared sensor. The passenger information acquisition unit 21 can detect body temperature of the passenger by means of the infrared sensor and detect blood flow and pulse. Another example of the passenger information acquisition unit 21 includes a mechanism including a pressure sensor, a temperature sensor, a microphone respectively set on a seat. By means of these sensors, the mechanism can detect body temperature, cardiac sound, breath, behavior, and voice of the passenger. In a case where a mobile terminal such as a smartphone or a smartwatch carried by the passenger implements a detection function that enables a detection of abnormal element(s) of, for example, body temperature and/or cardiac sound, the detection unit 11 may have a communicationally-detection function that enables, by a communication with the mobile terminal (as an example of the passenger information acquisition unit 21), the detection unit 11 to detect the abnormal element(s). As shown by an imaginary line in FIG. 1, the automated operation vehicle control unit 1 is electrically connected with a reclining actuator 100 of a seat. This automated operation vehicle control unit 1 causes the reclining actuator 100 to adjust the inclination angle of a backrest of the seat (not shown) such that the backrest is tilted rearward after the vehicle 4A has been caused to stop by a stop unit 13. Such a seat, which can be electrically caused to recline, is typically called a power seat and is well-recognized to be installed on high-end car. This power seat, which cooperates with the automated operation vehicle control unit 1, secures the airway of the passenger, being attacked by a certain physical disorder (the passenger is also a driver in case of a semi-automated vehicle). This airway management can prevent the body condition of the passenger from worsening and provide a first-aid effect.

The passenger information acquisition unit 21 is not necessarily installed inside the vehicle. The passenger information acquisition unit 21 may be an imaging unit which is installed on, for example, a traffic light, a utility pole, a road sign, or a wall surface of a building or the like, and is configured to capture a behavior or the body temperature of the passenger of the vehicle 4A from outside the vehicle. In a case where the detection unit 11 detects the abnormal condition of the passenger on the basis of the abnormal element data captured from outside of the vehicle, the detection unit 11 identifies the vehicle 4A the captured passenger is riding and operates the abnormal condition handling function of the automated operation control function by remote control.

Automated Operation Vehicle Control Unit 1: Notification Unit 12

Figure 3:
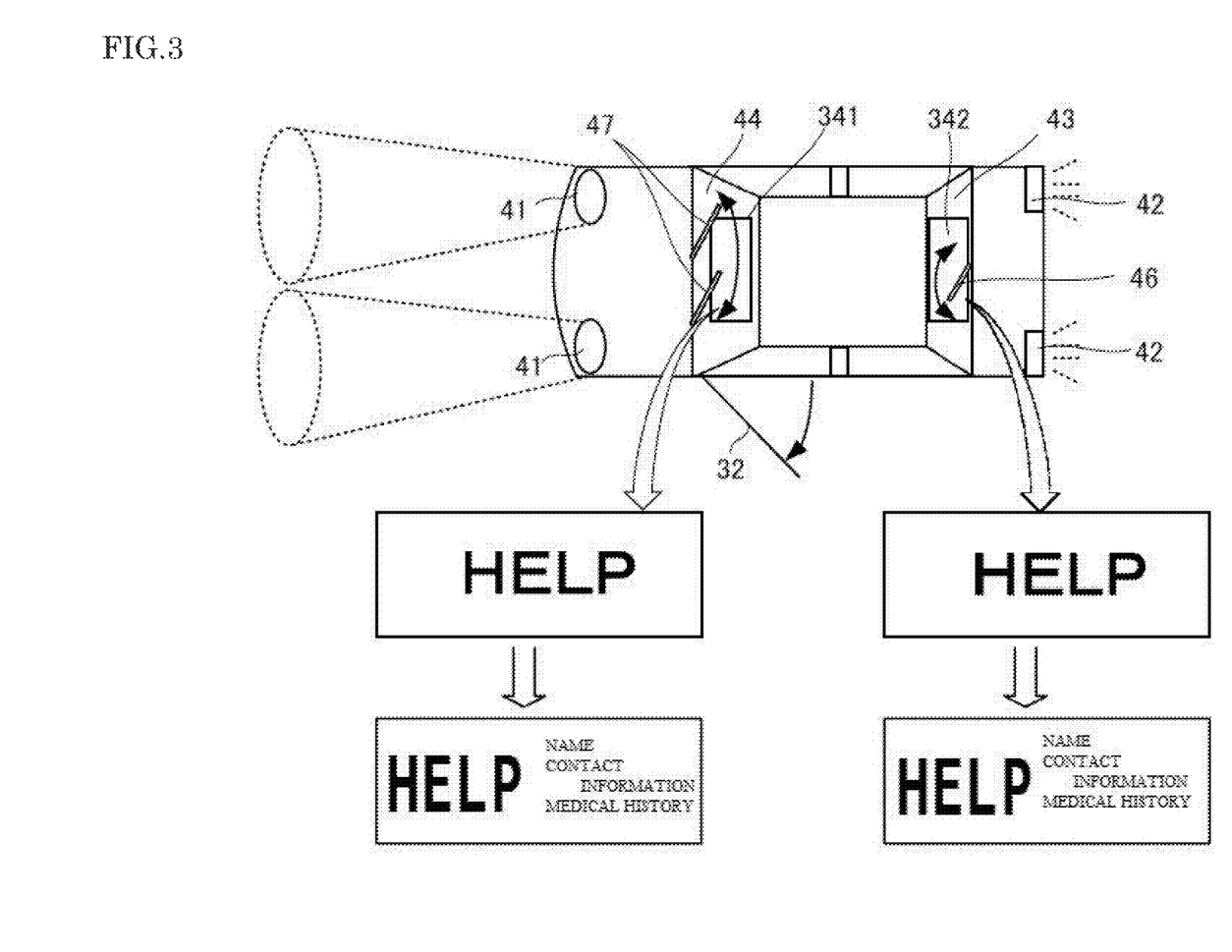
FIG. 3 is a schematic diagram illustrating the operation of the automated operation vehicle control unit.

The notification unit 12 may employ a variety of communication media including voice, light, and radio as long as, by these media, the abnormal condition is notified to the pedestrians 5B. For example, as shown in FIG. 3, the notification unit 12 may notify of the abnormal condition of the passenger by causing lights 41, 42 of the vehicle 4A to light in a predetermined manner. In this case, by the lighting manner of the lights 41, 42, the abnormal condition of the passenger can be noticed in darkness. Examples of "lights 41, 42 of the vehicle 4A" may include headlights 41, small lights (side lights), turn-signal lights, fog lights, brake lights, back lights 42, a license plate light, and an interior light. The term "a lighting manner of the lights 41, 42" means that the lights described above light in a different color or with a different switch interval than usual.

The notification unit 12 may be configured to notify the pedestrians 5B of the abnormal condition with a car horn. Additionally, the notification unit 12 may be configured to transmit a rescue-signal, such as an FM radio wave and output rescue-information in the form of voice from the radio installed in the vehicle 4B at the periphery of the vehicle 4A.

In a case where the vehicle 4A includes transmissive displays 341, 342 disposed on a window, the notification unit 12 may employ the transmissive displays 341, 342 as a notification mechanism of the notification unit 12. That is, the automated operation vehicle 4A may include the automated operation vehicle control unit 1 and the transmissive displays 341, 342 and the notification unit 12 may display the rescue-information about the abnormal condition on the transmissive displays 341, 342. According to this configuration, the rescue-information about the abnormal condition is displayed by the transmissive displays 341, 342. By the display of the rescue-information, a person located far away from the vehicle 4A can recognize the condition of the passenger. The rescue-information may include literal information such as "HELP" and an image such as a video or a static image.

As shown in FIG. 1, when the vehicle 4A includes the display 34 configured to display information in a manner that the information can be recognized by the pedestrians 5B 4A, the notification unit 12 may display message information including personal information of the passenger on the display 34. According to this configuration, the identification information, a medical history, and a transfer destination of the passenger can be acquired easily due to the message information including the personal information of the passenger. The term "display 34" includes a car navigation system and a head up display installed in the vehicle, for example, as well as the transmissive displays 341, 342.

The notification unit 12 may display the message information including the personal information of the passenger on the display 34 after a predetermined time period for observation has elapsed since the vehicle 4A is caused to stop. The term "message information including personal information" means, for example, name, contact information, medical history, or the like, as shown in FIG. 3. According to this configuration, when the passenger remains incapable of having a conversation over the predetermined time period for observation after the stop of the vehicle 4A, the identification information, a medical history, and a transfer destination of the passenger can be acquired easily due to the message information including the personal information of the passenger. Also, the display of the personal information of the passenger is waited until the predetermined time period for observation has elapsed. This configuration can prevent easy leak of the personal information. The predetermined time period for observation may be started at the time when the person trying to rescue speaks to the passenger in the abnormal condition or when the abnormal condition of the passenger is detected, as well as when the vehicle 4A is caused to stop.

The notification unit 12 may display the message information including the personal information of the passenger on the display 34 when the conscious level of the passenger is a level at which the passenger is incapable of communication. According to this configuration, the identification information, a medical history, and a transfer destination of the passenger can be acquired easily due to the message information including the personal information of the passenger when the conscious level of the passenger is a level at which the passenger is incapable of communication.

Automated Operation Vehicle Control Unit 1: Conversation Unit 17

It may be determined whether the conscious level of the passenger is a level at which the passenger is incapable of communication, on the basis of the data acquired from the body of the passenger such as blood pressure, blood stream, pulse, body temperature, or breath. Alternatively, it may be determined on the basis of the content of the conversation with the passenger.

Specific determination process based on the content of the conversation will be described as follows. The automated operation vehicle control unit 1 includes a conversation unit 17 that converses with the passenger when the detection unit 11 detects the abnormal condition of the passenger and a conscious level determination unit 18 that determines the conscious level of the passenger on the basis of the content of the conversation by the conversation unit 17. The notification unit 12 may display the message information including the personal information of the passenger on the display 34 when the conscious level determination unit 18 determines that the conscious level of the passenger is a level at which the passenger is incapable of communication. The conversation unit 17 performs a conversation with the passenger by means of a microphone 24 that collects voice of the passenger and a speaker 35 that outputs voice toward the passenger, if these units are installed on the vehicle 4A.

The function of the microphone 24 and the speaker 35 may be provided by employing the speaker 35 as the microphone 24. That is, the speaker 35 may be employed for both a voice output function and a voice acquisition function.

Conversation by the conversation unit 17 is not limited to a conversation by means of a microphone and a speaker. For example, conversation may be performed in a manner that the conversation unit 17 displays questionnaires on the display 34 and then the passenger reads the questionnaires and answers by capturing the motion of his/her fingers or hands, head, mouth, eyes, eyelids or the like by the camera unit. For example, a nod motion is acceptable. In a case where the passenger has difficulties in voicing or hearing sound, conversation with the passenger can be achieved.

Automated Operation Vehicle Control Unit 1: Conscious Level Determination Unit 18

The conscious level determination unit 18 determines the conscious level of the passenger on the basis of the number of correct and incorrect answers of the passenger for the plural questions that have been, for example, the conversation unit 17 asked the passenger about name, date of birth, address and the like. The conscious level determination unit 18 may determine the conscious level of several stages such as low, moderate, severe, and the like. According to the conscious level of each stage, the notification unit 12 may change its operation.

Automated Operation Vehicle Control Unit 1: Stop Unit 13

The automated operation vehicle control unit 1 may include a stop unit 13 that causes the vehicle 4A to stop when the detection unit 11 detects the abnormal condition of the passenger while the vehicle 4A is traveling. According to this configuration, the vehicle 4A traveling is caused to stop and a quick rescue for the passenger can be achieved. As shown in FIG. 2, it is preferable for the stop unit 13 to cause the vehicle 4A, which is traveling in the middle of plural lanes or in a lane that is opposite to the sidewalk, to stop close to the sidewalk where pedestrians are walking. In this case, the person 5B at the sidewalk can immediately come close to the passenger. Also, it is preferable that, when the sidewalks do not exist nearby, for example due to a drive-way such as an expressway, the stop unit 13 searches the nearest sidewalk from the drive-way on the basis of a GPS unit that is an example of local-circumstance-acquisition unit 22 and a map information storage 23, travels to the searched sidewalk, and stops close to the sidewalk. The stop unit 13 may cause the vehicle-installed camera to shoot a sidewalk and cause the vehicle 4A to stop, providing that the stop unit 13 determines that there exists the person 5B on the sidewalk. Furthermore, the stop unit 13 may cause the vehicle 4A to stop after the vehicle 4A has come close to the person 5B at the sidewalk.

Also, when a drone 6 is installed on the vehicle 4A, the stop unit 13 causes the drone 6 to take off outward from an opening such as a window or a door of the vehicle 4A at the same time as or right before the stop of the vehicle 4A. Then the drone 6 may be further caused to fly above, behind, front, and side of vehicle 4A. The drone 6 may have a display plate displaying stop information and the rescue-information while flying. By this configuration, the rescue-information can be notified for a broad area in addition to that rear-end collision can be avoided when a following vehicle is not an automated operation vehicle 4B.

The drone 6 with the display plate may fly behind, front, or side of the vehicle 4A and have the display plate displaying the stop information while landing on a road or keeping a flight in a case of a breakdown of the vehicle 4A. In this case, the passenger does not have to get off the vehicle 4A to install a warning triangle, leading to a decrease of the possibility that the passenger is involved in an accident. Alternatively, the drone 6 may have respective units 11-19 constituting the abnormal condition handling function. Furthermore, the drone 6 may monitor an abnormal condition of the passenger and deal with the abnormal condition in cooperation with the automated operation vehicle control unit 1. In this case, the drone 6 may be provided with the abnormal condition handling function. Also, when the passenger, who gets out of the vehicle while carrying drone 6, falls into an abnormal condition, the drone 6 can detects the abnormal condition and notify of the abnormal condition for surroundings while flying.

Automated Operation Vehicle Control Unit 1: Unlock Unit 14

As shown in FIG. 1, the automated operation vehicle control unit 1 may include an unlock unit 14 that causes a power door lock mechanism 31 configured to lock a door of the vehicle 4A automatically to unlock the door after the stop unit 13 causes the vehicle 4A to stop or while the vehicle 4A is stopped. According to this configuration, the door is unlocked after the stop of the vehicle 4A under the condition that the passenger cannot open or close the door. Thus, the pedestrians 5B 4A can open the door without a vehicle key and bring the passenger out of the vehicle.

Automated Operation Vehicle Control Unit 1: Door-Open Unit 15

The automated operation vehicle control unit 1 may include a door-open unit 15 that causes an automatic door 32 of the vehicle 4A to open while the vehicle 4A is stopped or after the stop unit 13 causes the vehicle 4A to stop. According to this configuration, as shown in FIG. 3, the automatic door 32 is caused to open after the stop of the vehicle 4A under the condition that the passenger cannot open or close the automatic door 32. Thus, the pedestrians 5B 4A can bring the passenger out of the vehicle 4A quickly. Also, as the vehicle 4A remains stopped with its door opened, a person located far away from the vehicle 4A can notice the abnormal condition.

Automated Operation Vehicle Control Unit 1: Window-Open Unit 16

The automated operation vehicle control unit 1 may include a window-open unit 16 that causes a power window 45 of the vehicle 4A to open while the vehicle 4A is stopped or after the stop unit 13 causes the vehicle 4A to stop. According to this configuration, as shown in FIG. 2, the power window 45 is caused to open after the stop of the vehicle 4A under the condition that the passenger cannot operate the power window 45. Thus, the pedestrians 5B 4A can speak to the passenger. The window-open unit 16 may cause the power window 45 to repeatedly open and close. In this case a person located far away from the vehicle 4A can notice the abnormal condition due to opening/closing of the power window 45. Also, the window-open unit 16 or the door-open unit 15 may cause a trunk lid 48 to open or windscreen wipers 46, 47 to swing so that a person far away from the vehicle 4A can easily notice the abnormal condition.

Automated Operation Vehicle Control Unit 1: Restart Unit 19

As shown in FIG. 1, automated operation vehicle control unit 1 may include a restart unit 19 that causes the vehicle 4A to travel to the nearest hospital when the passenger is present in the vehicle 4A after a predetermined time period for waiting a rescue has elapsed since the vehicle 4A is caused to stop. That is, the restart unit 19 searches the nearest hospital on the basis of the GPS unit and the map information storage 23. Also, when the vehicle 4A includes local-circumstance-acquisition unit that can acquire local circumstance data such as traffic jam information or information about construction on each road, the restart unit 19 may search a hospital that can be reached in the shortest time on the basis of the local circumstances as the nearest hospital. According to this configuration, the vehicle 4A, which has once stopped, is allowed to transport the passenger to a hospital when the passenger falls into an abnormal condition at an empty area, in particular, without a person 5B that calls an emergency vehicle.

In a case where securing a person trying to rescue is difficult such as that there does not exist a vehicle 4B or pedestrians 5B around the vehicle 4A, the restart unit 19 may cause the vehicle 4A to function as an emergency vehicle. Namely, the restart unit 19 may search the nearest hospital on the basis of the local circumstance information of the GPS unit, the map information storage 23, and the local-circumstance-acquisition unit 22, and then transport the passenger to the hospital. In this case, it is preferable that the notification unit 12 causes the transmissive displays 341, 342 or lights 41, 42 to display or output emergency vehicle information to notify that the vehicle 4A is an emergency vehicle for the periphery of the vehicle 4A.

In a case where an emergency vehicle mode is set in advance, the restart unit 19 may perform the operation described above as an emergency vehicle under the condition that a person trying to rescue is easily secured at the periphery of the vehicle. Also, it is preferable for the notification unit 12 to inform a police agency or a traffic management center when the vehicle 4A travels as an emergency vehicle. It is also preferable that the notification unit 12 registers emergency vehicle information indicating that the vehicle 4A provided with this notification unit 12 is an emergency vehicle on the traffic management website and that each person 5B that is on another vehicle 4B, working at public transportation, working at the hospital that is a transportation destination can monitor the location where the emergency vehicle traveling. In this case, a person in charge at the hospital of the transportation destination, for example, can make an optimized treatment preparation by the expected time of arrival while monitoring the location where the emergency vehicle is traveling and the condition of the passenger.

Automated Operation Vehicle Control Unit 1: Automated Operation Vehicle Control Program On the basis of the configuration described above, an example of operations of the automated operation vehicle control unit 1 will be described according to flow charts illustrating automated operation vehicle control program. It should be noted that although description will be made to this embodiment in which the automated operation vehicle control program includes an abnormal condition handling routine as a main routine, and an abnormal condition detection routine, a notification routine, and stop routine as sub routines of the abnormal condition handling routine, the invention is not to be limited to this embodiment and processes of units 11-19 of the automated operation vehicle control unit 1 may be operably programmed respectively.

The automated operation vehicle control program may be acquired through the Internet and installed on the automated operation vehicle control unit 1. Alternatively, the automated operation vehicle control program stored in a storage medium such as a CD-ROM or the like may be installed on the automated operation vehicle control unit 1. That is, the automated operation vehicle control program may have the abnormal condition handling function alone or the automated operation control function including the abnormal condition handling function and may be provided from a server through communication or from a storage medium storing the automated operation vehicle control program therein.

Figure 4:
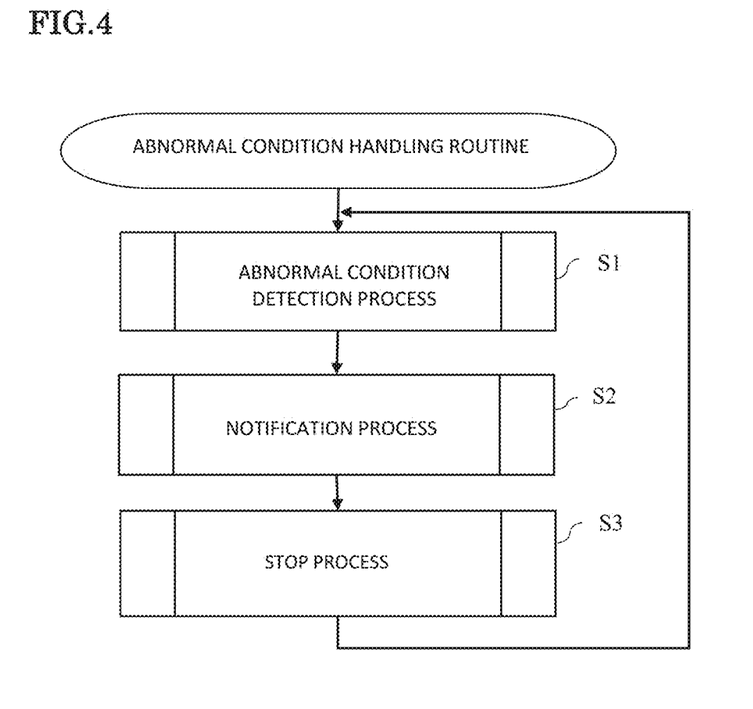
FIG. 4 is a flow chart showing an abnormal condition handling routine.

When an operation unit (not shown) of the automated operation vehicle control unit 1 performs the abnormal condition handling routine stored in a memory, respective processes including an incapable-drive-detection process (S1), a notification process (S2), and a stop process (S3) are performed repeatedly.

Figure 5:
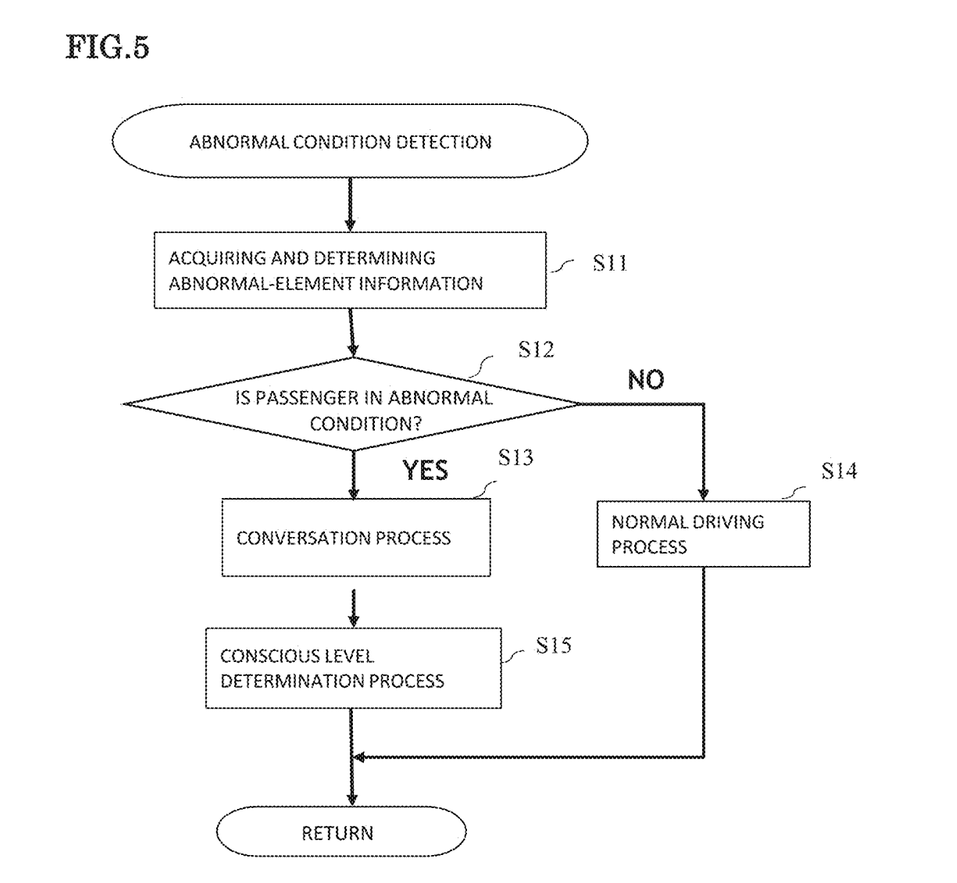
FIG. 5 is a flow chart showing an abnormal condition detection routine.

Automated Operation Vehicle Control Unit 1: Abnormal Condition Detection Routine In the abnormal condition detection routine, the abnormal-element information output from the passenger information acquisition unit 21 is acquired. The presence or absence of the abnormal condition is determined on the basis of at least one element of body temperature, cardiac sound, breath, and behavior that are included in the abnormal-element information (S11). In a case where the passenger is not in the abnormal condition (S12: NO), normal driving is kept (S14) and the abnormal condition detection routine finishes. On the other hand, when the passenger is in the abnormal condition (S12: YES), a conversation process, namely a conversation with the passenger is performed (S13). Then, a conscious-level-determination process in which the conscious level of the passenger is determined on the basis of the content of the conversation is performed. Either of capableness or incapableness of a conversation is determined as the conscious level (S15) and the abnormal condition detection routine finishes.

Automated Operation Vehicle Control Unit 1: Notification Routine

Figure 6:
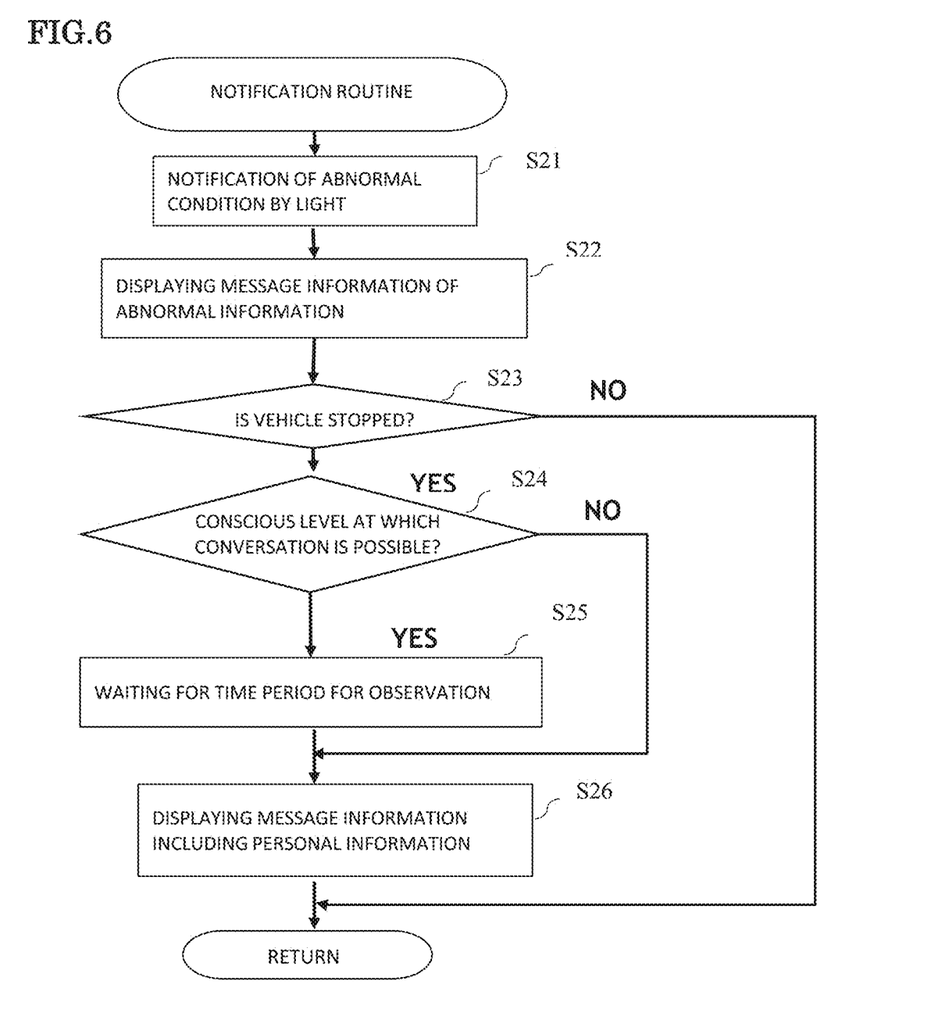
FIG. 6 is a flow chart showing a notification routine.

The notification routine is performed when it is determined that the passenger is in the abnormal condition. First, notification of the abnormal condition by lights such as head lights 41, back lights 42 is performed (S21). Next, as shown in FIG. 3, the message information indicating the abnormal condition is displayed on the transmissive displays 341, 342 disposed on a windscreen 44 and a rear window 43 (S22).

Next, it is determined whether the vehicle 4A is stopped (S23). In a case where the vehicle 4A is not stopped (S23: NO), the notification routine finishes. On the other hand, when the vehicle 4A is stopped, whether the determined result in the conscious-level-determination process is the conscious level at which conversation is possible is determined (S24). In a case where the conscious level is the level at which conversation is impossible (S24: NO), the message information including personal information is immediately displayed (S26) and then the notification routine finishes. On the other hand, the conscious level is the level at which conversation is possible (S24: YES), after a predetermined time period for observation elapses (S25), the message information including the personal information is displayed (S26) and the notification routine finishes.

Automated Operation Vehicle Control Unit 1: Stop Routine

Figure 7:
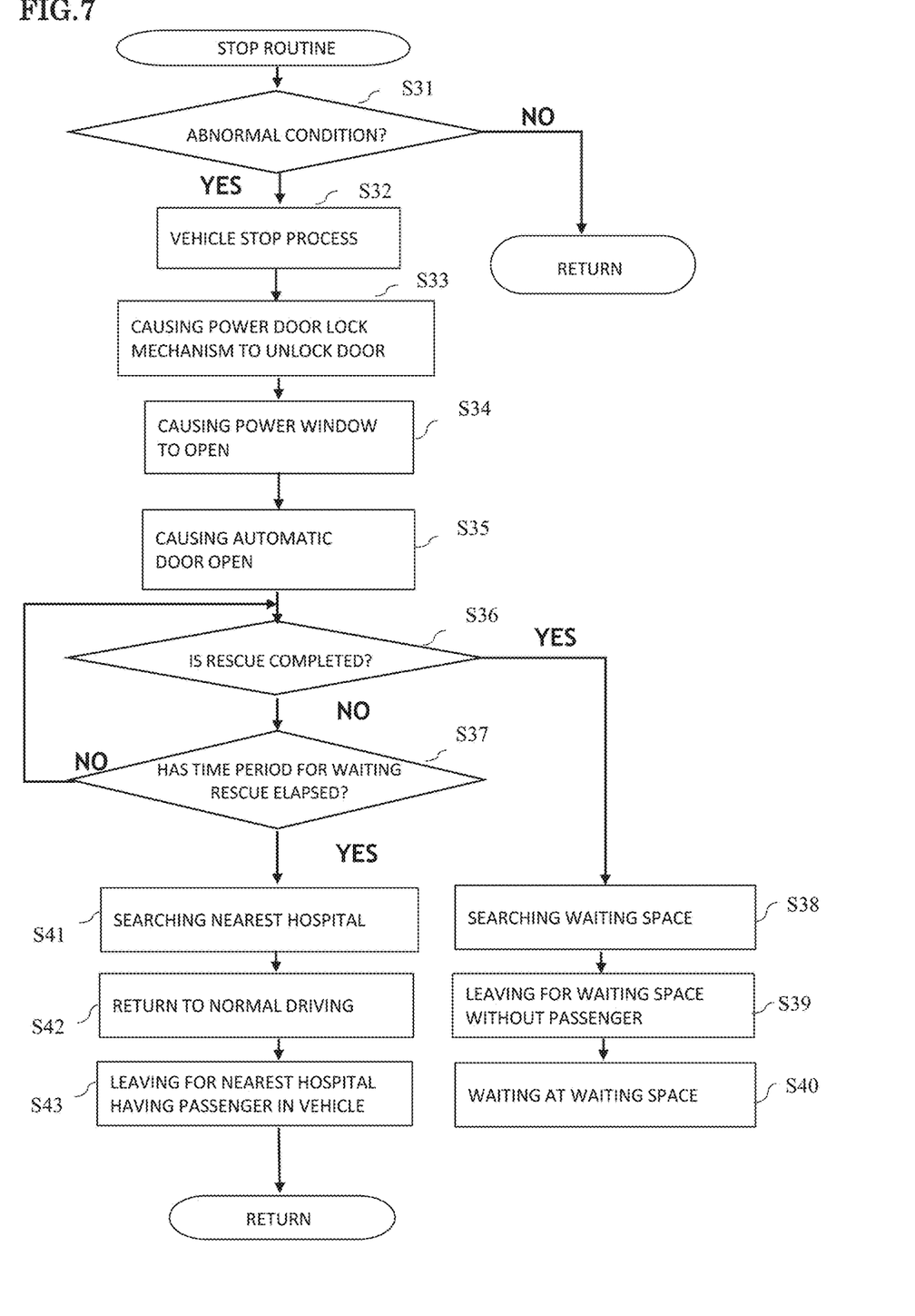
FIG. 7 is a flow chart showing a stop routine.
Figure 8:
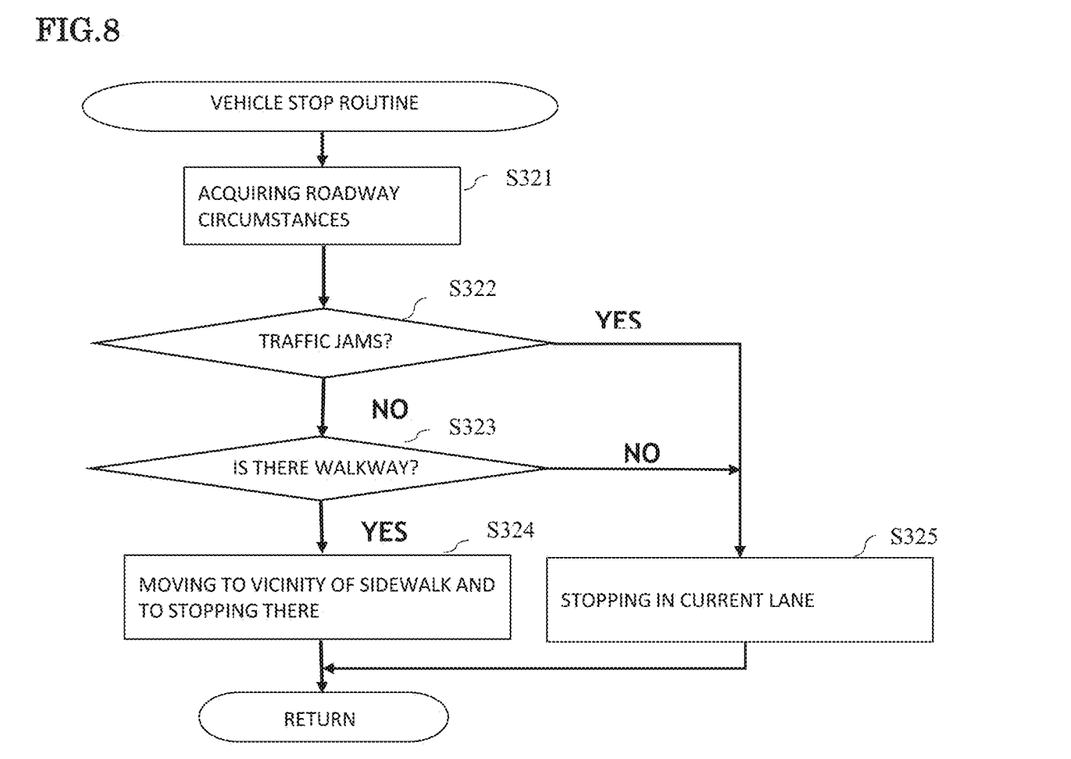
FIG. 8 is a flow chart showing a vehicle-stop routine.

The stop routine is performed when it is determined that the passenger is in the abnormal condition. That is, when the passenger is not in the abnormal condition (S31: NO), the stop routine finishes. On the other hand, in a case of the abnormal condition (S31: YES), vehicle 4A-stop process is performed. Specifically, as shown in the FIG. 8, roadway circumstances are acquired (S321). In a case where the roadway circumstances indicate traffic jams (S322: YES), the vehicle 4A is caused to stop in the current lane (S325), and the stop routine finishes. On the other hand, the roadway circumstances do not indicate traffic jams (S322: NO), whether a sidewalk is present at the lateral side of the roadway is determined (S323). In a case where a sidewalk is present (S323: YES), the vehicle 4A is caused to move to the vicinity of the sidewalk and to stop (S324) and the stop routine finishes.

As shown in FIG. 7, the power door lock mechanism 31 is caused to unlock the door (S33), the power window 45 is caused to open (S34), and the automatic door 32 is caused to open (S35). Note that these unlocking and opening may be performed simultaneously or in a different order. Next, whether the rescue is completed is determined (S36). In a case where the rescue is not completed (S36: NO), a next step is suspended until a predetermined time period for waiting rescue elapses (S37: NO). When the predetermined time has elapsed (S37: YES), the nearest hospital is searched (S41). Then, a normal driving is restarted (S42) and the vehicle 4A having the passenger therein leaves for the nearest hospital to transport the passenger to the hospital (S43).

On the other hand, when the rescue is completed (S36: YES), a waiting place such as the nearest parking space is searched (S38). The vehicle 4A leaves for the waiting place without the passenger (S39) and then, waits at the waiting place (S40). The waiting place may be a place designated by the passenger in advance such as a parking space of home of the passenger.

Automated Operation Vehicle Control Unit 1: Vehicle-Stop Processing Unit 52

The automated operation vehicle control unit 1 comprises seating detection units (e.g., the pressure sensors mentioned above) for each seating position on the seats, in which multiple seats are provided in the vehicle 4A. Sensors that determine whether someone is sitting in a particular seat within a vehicle such as an automobile are well known such that their provision is deemed to be well within the level of skill of a person having ordinary skill in the art. The automated operation vehicle control unit 1 further comprises a seat belt detection unit that determines whether the seat belt is being worn at each seat where a passenger is determined to be present. Like sensors that determine whether someone is sitting in a particular seat, such seat belt detection units are well known such that their provision is deemed to be well within the level of skill of a person having ordinary skill in the art. Thus, on the condition that seating is detected by the seating detection unit, the seat belt detection unit detects whether or not the seat belt is worn, the seat belt corresponding to the position where the seating is detected. If it is determined that the seat belt detected by the seating detection unit is worn, the automated operation vehicle control unit 1 sets the vehicle 4A in a state in which it is possible to start traveling.

Description is made to this embodiment in which the automated operation vehicle control unit 1 is the semi-automatic driving vehicle control unit as an example, that is used in a situation when a driver is present and it would switch to the automatic operation when the driver is incapacitated and unable to drive. When it is applied to the full automated operation without the driver, it is preferable that the automated operation vehicle control unit 1 comprises a vehicle-stop processing unit 52, and the vehicle-stop processing unit 52 controls to stop the vehicle automatically if an abnormal condition is detected. Based on the seating detection unit and the seat belt detection unit that detects whether the seat belt is worn or not, it is preferable to control so that the automated driving is possible to start on the condition that the passengers seated in all seating positions wear the seat belt. In this way, by controlling from the inoperable state to the operable state in which the driving can be started, it is possible for all the passengers in the vehicle 4A to perform the semi-forced seat belt wearing.

And as shown in FIG. 1, the seat belt may include an electric lock for seat belt 51 that can forcibly release the worn seat belt by the automated operation vehicle control unit 1. Systems that can automatically release a fastened seatbelt are known in the art and can rely on a mechanism that physically cuts the webbing of the seatbelt, or they can use a solenoid to actuate the release mechanism of the buckle assembly as disclosed, for example, in U.S. Pat. No. 5,121,527 to Righi or U.S. Pub. 2009/0139069 to Thomas, the contents of which are incorporated by reference. According to the processing flow shown in FIG. 5, when the abnormal condition of the passenger who is the driver is detected, a seat-belt release processing unit 50 in the automated operation vehicle control unit 1 executes the process to automatically unlock the seat belt wearing state, that is, the electric lock 51.

If the purpose is to rescue the driver easily from the people outside of the vehicle, the electric lock 51 may be controlled to forcibly unlock wearing state of the driver's seat belt. However, for example, when a person sitting in the back seat rescues a driver, the following problem may occur. That is, when the driver suddenly experiences epilepsy or the like and the detection unit 11 detects the abnormal condition, such as the conscious level is determined to be at a level of being difficult or impossible to drive (by using the processing shown in FIG. 5, for example), the stop unit 13 in the automated operation vehicle control unit 1 forcibly stops the vehicle and the unlock unit 14 unlocks the door and the electric lock 51 controls to release the driver's seat belt from the wearing state.

Since the driver's seat belt is released, the driver can be released from the seat belt that is seated. But the problem is that the passenger who needs to play the role of a rescuer may panic by understanding the situation. In preparation for such case, in this embodiment, it is preferable that when the vehicle is stopped, the stop is detected by a sensor (not shown), the door lock is unlocked, and at the same time, all electric locks 51 of the seat belts in the vehicle be released by the control of the seat-belt release unit 50, so that the driver and other passengers' wearing state of the seat belt is released.

In addition, in this embodiment, it is assumed that the person in the vehicle is the only driver driving the vehicle, so it is easy for people outside of the vehicle to rescue the driver. As a modified example, first, the vehicle may be constructed to make it easier for at least one passenger inside the vehicle to rescue the driver than the people outside the vehicle.

In case of the passengers inside the vehicle may be children or elderly people, while referring to seating history information before abnormality detection, in all seats (including the seat of the driver who was detected the abnormal condition) where seating was detected, it is also possible to notify the surroundings outside of the vehicle by the notification unit 12, when the departure from the seated state is not detected by at least one seat within the predetermined time measured from the abnormal detection by a timer 55.

Figure 9:
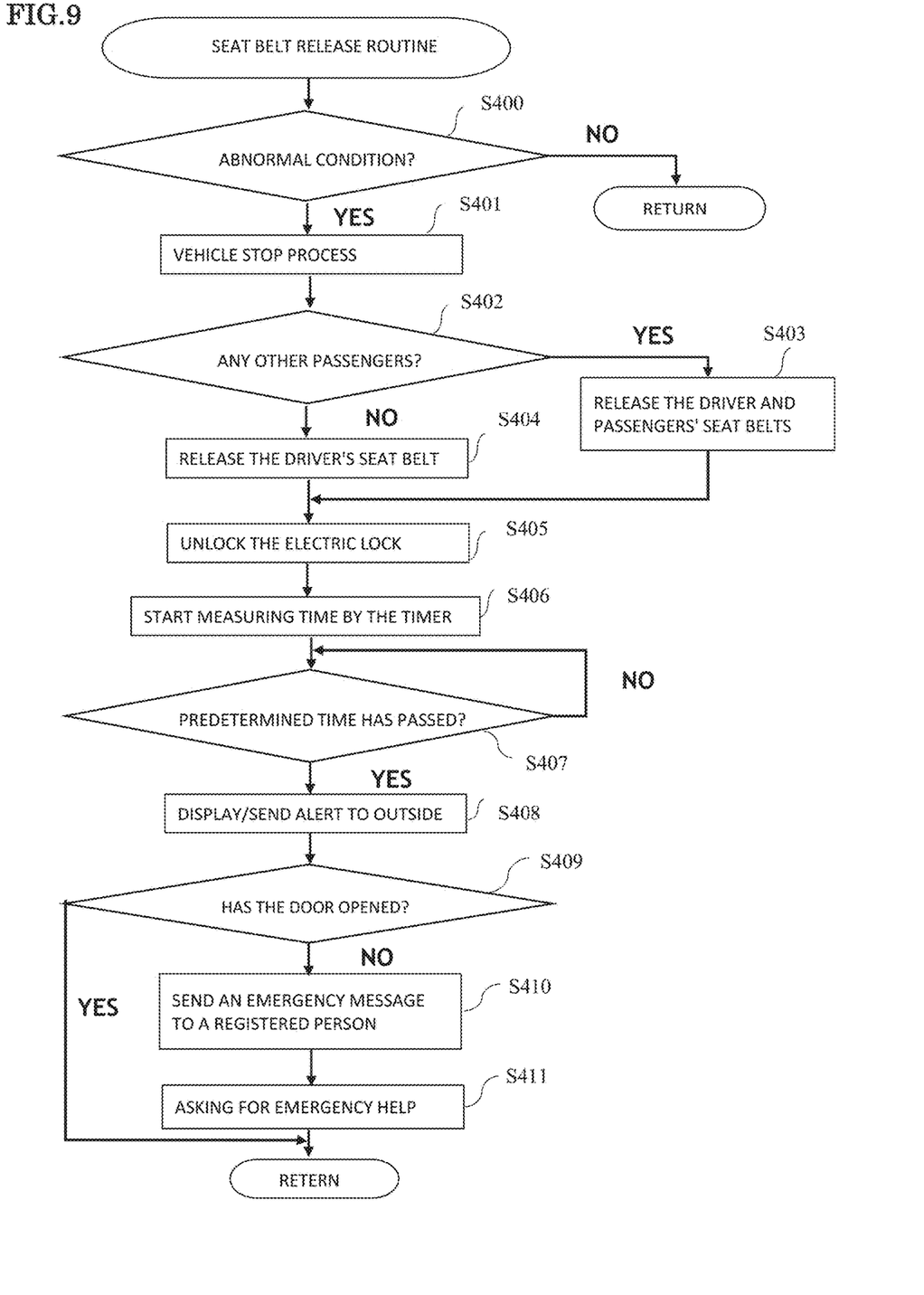
FIG. 9 is a flow chart showing a seat-belt release routine.

As one of the examples of the two-step notification control, for a few minutes after the vehicle is stopped, an alert is executed by sound or light to notify a passenger (or passengers) inside of the vehicle of the abnormality (the first stage notification). After that, when the release of the seated state is not detected in at least one seat during the predetermined time, the notification can be started to the outside of the vehicle (the second stage notification). By executing this two-step notification, it is possible to add a function to rescue the driver without making it too exaggerated. Based on FIG. 9 (FIG. 9 added in this CIP), the rescue process by the two-stage notification will be described more specifically below.

Automated Operation Vehicle Control Unit 1: Seat-Belt Release Routine

As shown in FIG. 5, when the abnormality of the driver is detected, the stop unit 13 stops the vehicle (S401). When the stop is detected, it is determined whether there was a passenger as well as a driver as the seating history information (S402). If there are other passengers other than the driver (S401: YES), the seat-belt release processing unit 50 controls the electric lock for seat-belt 51 to release the seat belts of the driver and the passengers (S403). On the other hand, when there was no passenger other than the driver (S401: NO), the seat-belt release processing unit 50 controls the electric lock for seat-belt 51 to release the seat belt of the driver (S404). Then at the same time or just after unlocking the electric lock 51, the door-open unit 15 unlocks the power door lock mechanism 31 (S405). In order to measure the time after the unlocking is executed, the timer 55 is used to start the measurement (S406). Even after the elapse of a predetermined time by the timer 55 (S407: YES), when the seating sensor 56 does not detect that the seat is separated from the seated state in at least one of the seats in which seating has been detected, then the alert is displayed/transmitted to the outside of the vehicle (S408). In a case, the lights 41, 42 and/or the display 34 can be functioned as alert displays. When the opening of the door is not detected by a sensor 57 within the predetermined time measured by the timer 55 (S409: NO), a communication processing unit 53 uses the communication device 54 to send a person or place registered in advance a message so that emergency communication is performed.

Automated Operation Vehicle Control Unit 1: Communication Processing Unit 53

Further, the communication processing unit 53 stores a plurality types of message information prepared in advance, and selects one message from the plurality types of messages according to the data acquired by the passenger acquisition device 21. The communication device 54 transmits the selected message to a predetermined address (S410 and S411). By adopting such a configuration, the following invention can be provided.

Invention 1

Automated operation vehicle Control unit 1 includes a detection unit 11 that detects the abnormal condition of the passenger, a seating detection unit (i.e. the seating sensor 56) that detects the passenger's seating, and a detecting and releasing unit (the seat-belt release processing unit 50) that detects the wearing state of the seat belt provided at the seating position, wherein each seat belt includes a seat-belt wearing release mechanism (e.g., the electric lock for seat belt 51), that can forcibly release the worn seat belt.

In the case the detection unit detects the abnormal condition of the passenger, the seat-belt wearing release mechanism controls to release the worn seat belt automatically.

In addition to the explanation above, another invention can be provided by adding the following configuration.

That is: the detection units are provided on all seats of the vehicle, the detection units detect the wearing status corresponding to each seat, and the seat-belt wearing release mechanism is provided for each detection device. In case of the detection of the vehicle driver's abnormal condition, the processor controls to release wearing of the seat belt of the driver's seat, and releases other passengers' seat belts that is detected to be seated.

In the detailed description described above, explanations focused on the features in order that the present invention is well understood. The present invention is not limited to the detailed description described above and can be applied to other embodiments. Thus, the present invention can be widely applied. Furthermore, the terms and the expressions used in the detailed description are only used for explanation and are not intended to limit the construction of the present invention. Also, it is considered that those skilled in the art can easily reach other configurations, systems, methods and the like that are included in the concept of the present invention on the basis of the concept of the present invention. Accordingly, descriptions for claims should be deemed to include equivalent configurations as long as such configurations are within the technical idea of the present invention. Also, the purpose of abstract is allowing the artisan or the like in the art that does not familiar to a patent office and general public offices, patent or law terms, or technical terms to determine the technical content and the nature of the present application with a simple research. Thus, abstract is not intended to limit the scope of the invention, which is to be evaluated by the description of claims. Also, it is preferable that the purpose and particular effect of the present invention are construed by taking disclosed literatures or documents into consideration sufficiently for full understanding of the purpose and particular effect.

What is claimed is:

1. An automated operation vehicle control unit for an autonomous vehicle having 1) a seating detection unit that detects seating on seats within the autonomous vehicle, 2) and a seat belt detection unit that detects the wearing state of a seat belt at each of the seating positions within the autonomous vehicle where seating has been detected, the seat belts including a seat belt releasing mechanism that forcibly releases a worn seat belt, the automated operation vehicle control unit comprising: one or more processors; and a memory storing instructions that when executed by the one or more processors cause the autonomous vehicle to perform processes comprising a detection process which detects an incapacitated condition of a passenger of the autonomous vehicle; in order, 1) a stop process which autonomously stops the autonomous vehicle when the incapacitated condition of the passenger is detected by the detection process while the autonomous vehicle is traveling; and 2) an unlock process which causes an automatic lock mechanism of doors of the autonomous vehicle to be unlocked automatically after the autonomous vehicle has been stopped by the stop process; and a notification process which notifies, to regions exterior to the autonomous vehicle, of the incapacitated condition of the passenger and rescue information about the passenger when the incapacitated condition of the passenger is detected by the detection process; wherein the automated operation vehicle control unit further includes a detection unit that detects abnormal condition information of the passenger to be used in the detection process, and the one or more processors automatically executes a process of canceling the wearing state of the seat belt by driving the seat belt releasing mechanism to forcibly release the worn seat belt when the passenger's abnormal condition is detected by the detection process of the one or more processors.

2. The automated operation vehicle control unit according to claim 1, wherein the detection process further comprises a conversation process that converses with the passenger.

3. The automated operation vehicle control unit according to claim 1, wherein the seating detection unit and the seat belt detection unit are provided at each seat of the autonomous vehicle, the seat belt detection unit detects the wearing state of the seat belt corresponding seat, the seat belt releasing mechanism is set to the seat belt detection unit, and when at least one passenger other than a driver is in the autonomous vehicle and abnormal condition of the driver is detected, the one or more processors controls the seat belt releasing mechanism to release the seat belts of the driver's seat and other passengers' seats where seating is detected.

4. The automated operation vehicle control unit according to claim 3, wherein the instructions, when executed by the one or more processors, further cause the autonomous vehicle to perform processes comprising a door opening process which causes automatic doors of the autonomous vehicle to be opened automatically after the autonomous vehicle has been stopped.

5. The automated operation vehicle control unit according to claim 1, wherein the instructions, when executed by the one or more processors, further cause the autonomous vehicle to perform processes comprising a door opening process which causes automatic doors of the autonomous vehicle to be opened automatically after the autonomous vehicle has been stopped.

* * * * *